(12) United States Patent
Ning et al.

(10) Patent No.: US 11,731,873 B2
(45) Date of Patent: Aug. 22, 2023

(54) GAS-SOLID SEPARATING METHOD AND SYSTEM FOR SIMPLE SUBSTANCE SULPHUR IN SULPHUR-CONTAINING EXHAUST

(71) Applicant: KUNMING UNIVERSITY OF SCIENCE AND TECHNOLOGY, Kunming (CN)

(72) Inventors: Ping Ning, Kunming (CN); Xin Song, Kunming (CN); Xin Sun, Kunming (CN); Yixing Ma, Kunming (CN); Kai Li, Kunming (CN); Senlin Tian, Kunming (CN)

(73) Assignee: Kunming University of Science and Technology, Kunming (CN)

( * ) Notice: Subject to any disclaimer, the term of this patent is extended or adjusted under 35 U.S.C. 154(b) by 715 days.

(21) Appl. No.: 16/821,623

(22) Filed: Mar. 17, 2020

(65) Prior Publication Data
US 2020/0299134 A1    Sep. 24, 2020

(30) Foreign Application Priority Data
Mar. 18, 2019    (CN) .......................... 201910204643.0

(51) Int. Cl.
  *B01D 53/14*    (2006.01)
  *C01B 17/02*    (2006.01)
  *B01D 53/18*    (2006.01)

(52) U.S. Cl.
  CPC ........ *C01B 17/021* (2013.01); *B01D 53/1425* (2013.01); *B01D 53/1493* (2013.01); *B01D 53/185* (2013.01); *B01D 2252/10* (2013.01)

(58) Field of Classification Search
  CPC ........ B01D 53/14; B01D 53/18; B01D 47/06; B01D 53/1425; B01D 53/1431; B01D 53/1493; B01D 53/185; C01B 17/02; C01B 17/021; F25J 3/06
  See application file for complete search history.

(56) References Cited

U.S. PATENT DOCUMENTS

2020/0368680 A1*  11/2020  Morun ................... B01D 53/83

* cited by examiner

*Primary Examiner* — Sharon Pregler
(74) *Attorney, Agent, or Firm* — Hauptman Ham, LLP

(57) ABSTRACT

A gas-solid separating method and a gas-solid separating system for simple substance sulphur in sulphur-containing exhaust are provided. The gas-solid separating method for simple substance sulphur in sulphur-containing exhaust comprises the following steps: first, cooling sulphur-containing exhaust at an extremely high speed; then, separating dust; finally, recycling a heavy liquid phase solvent and simple substance sulphur. The system comprises a quick cooling system, a low-temperature washing and purifying system, a light liquid phase and heavy liquid phase separating system, a washing liquid recycling system and a simple substance sulphur recycling system.

20 Claims, 1 Drawing Sheet

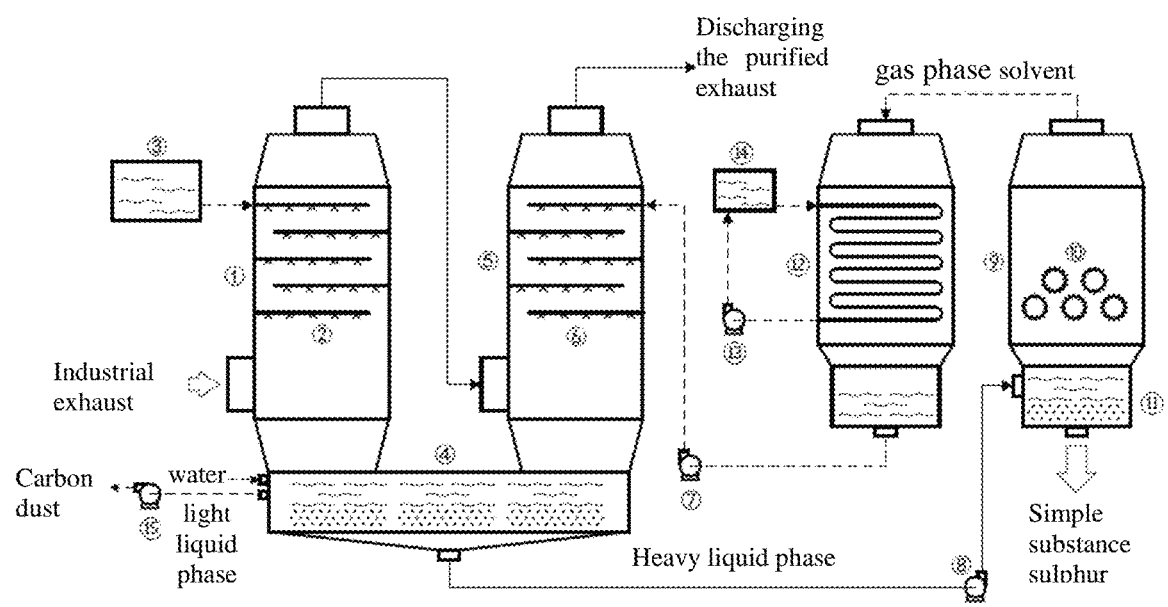

GAS-SOLID SEPARATING METHOD AND SYSTEM FOR SIMPLE SUBSTANCE SULPHUR IN SULPHUR-CONTAINING EXHAUST

TECHNICAL FIELD

The present invention belongs to the technical field of environmental pollution treatment, and in particular to a gas-solid separating method and system for simple substance sulphur in sulphur-containing exhaust.

BACKGROUND

As an important chemical raw material, sulphur and sulphur products are widely used in various sectors of the national economy such as agriculture, chemical industry, light industry, metallurgy, building materials, and medicine. At present, the sulphur produced in the world mainly comes from natural sulphur deposits, sour natural gas, high-sulphur crude oil, high-sulphur iron ore, and non-ferrous metal sulfides. Whether these sulphur resources can be utilized depends on their recycling cost. As environmental regulations become more stringent, the proportion of recycled sulphur in sulphur resources will become larger and larger. At present, $H_2S$ in the sulphur-containing exhaust can be oxidized to simple substance sulphur by the Claus method, and $SO_2$ can be produced into simple substance sulphur by reduction. However, the exhaust treated by these methods still contains a small amount of simple substance sulphur particles, which not only causes waste of sulphur resources, but also has problems such as secondary pollution. In order to reduce the harm of simple substance sulphur and improve the utilization rate of simple substance sulphur, it is necessary to develop a gas-solid separating method and system for simple substance sulphur in sulphur-containing exhaust.

SUMMARY

A first object of the present invention is to provide a gas-solid separating method for simple substance sulphur in sulphur-containing exhaust.

A second object of the present invention is to provide a system for the gas-solid separating method for simple substance sulphur in sulphur-containing exhaust.

The first object of the present invention is achieved in this way and comprises the following steps:

S1. rapidly cooling the sulphur-containing exhaust to a temperature below 25° C. so that the simple substance sulphur vapor in the sulphur-containing exhaust is condensed into simple substance sulphur solid particles, and the simple substance sulphur solid particles and dust particles are settled to an extraction tank;

S2. washing the exhaust at a low temperature, wherein the washing liquid is a low-temperature heavy liquid phase solvent, the washed exhaust is discharged, the washed liquid flows into the extraction tank, the dust is dissolved in the light liquid phase in the extraction tank, the light liquid is discharged, and the simple substance sulphur particles are dissolved in the heavy liquid phase in the extraction tank;

S3. extracting the heavy liquid, heating it to 50-90° C. by irradiation, collecting simple substance sulphur particles, and evaporating to produce a heavy gas phase solvent;

S4. cooling the heavy gas phase solvent to a temperature below 25° C. so that the heavy gas phase solvent is converted into a heavy liquid phase solvent, the heavy liquid phase solvent is extracted and returned to step S2, and the washing liquid consumed for washing exhaust is replenished.

The second object of the present invention is achieved in this way, and comprises a quick cooling system, a low-temperature washing and purifying system, a light liquid phase and heavy liquid phase separating system, a washing liquid recycling system and a simple substance sulphur recycling system, the exhaust discharging end of the quick cooling system is connected with the exhaust inlet end of the low-temperature washing and purifying system through a pipeline, the light liquid phase and heavy liquid phase separating system is connected with the discharging port of the simple substance sulphur and dust of the cooling system and the discharging port of the washing liquid of the low-temperature washing and purifying system, respectively, the washing liquid of the low-temperature washing and purifying system is a low-temperature heavy liquid phase solvent, the discharging end of the heavy liquid phase of the light liquid phase and heavy liquid phase separating system is connected with the washing liquid recycling system through a pipeline, the discharging end of the washing liquid of the washing liquid recycling system is connected with the low-temperature washing and purifying system, and the discharging end of the simple substance sulphur of the washing liquid recycling system is connected with the simple substance sulphur recycling system.

Compared with the prior art, the present invention has the following technical effects:

1. According to the method of the present invention, the sulphur-containing exhaust obtains usable simple substance sulphur by quenching and cooling in a dry method, washing and purifying the heavy liquid phase solvent at a low temperature, separating dust, and separating simple substance sulphur. The separating efficiency of the simple substance sulphur is up to 90 percent or above; moreover, the exhaust is further purified, and an environment pollution accident is avoided; in a separating process of the simple substance sulphur, the heavy liquid phase solvent of the simple substance sulphur evaporates to form a gas phase solvent which can be recycled as the liquid phase solvent through cooling and can be reused, so that the sulphur removing cost is reduced. The method has the advantages of energy conservation and environmental protection.

2. The system of the present invention comprises a quick cooling system, a low-temperature washing and purifying system, a light liquid phase and heavy liquid phase separating system, a washing liquid recycling system and a simple substance sulphur recycling system; the quick cooling system plays a role in cooling the exhaust at an extremely high speed. The low-temperature washing and purifying system washes and purifies the fume on the one hand, and sends the washing liquid into the light liquid phase and heavy liquid phase separating system on the other hand; the light liquid phase and heavy liquid phase separating system separates dust from simple substance sulphur to play the role of dust removal; the washing liquid recycling system evaporates the heavy liquid to produce a heavy gas phase solvent by heating by irradiation, and the simple substance sulphur particles can be recycled at the same time; the heavy gas phase solvent is recycled as the heavy liquid phase solvent through cooling to be reused by the low-temperature washing and purifying system. The system has the advantages of stability and high efficiency in sulphur-containing exhaust treatment,

BRIEF DESCRIPTION OF THE DRAWINGS

FIG. 1 is a schematic structural diagram of a system according to the present invention;

In the FIGURE: 1—a dry quenching tower, 2—an antifreezing spraying pipe, 3—a coolant storage tank, 4—a washing tower, 5—a low-temperature heavy liquid phase solvent spraying pipe, 6—an extraction tank, 7—a light liquid phase pump, 8—a heavy liquid phase pump, 9—an irradiation tower, 10—a cooling tower, 11—an irradiator, 12—a sulphur receiving tank, 13—a cooling water storage tank, 14—a recycling pump, 15—a delivery pump.

DESCRIPTION OF THE EMBODIMENTS

The present invention is further described below with reference to the accompanying drawings, but the present invention is not limited in any way. Any change or replacement made based on the teaching of the present invention belongs to the protection scope of the present invention.

The method of the present invention comprises the following steps:

S1. rapidly cooling the sulphur-containing exhaust to a temperature below 25° C. so that the simple substance sulphur vapor in the sulphur-containing exhaust is condensed into simple substance sulphur solid particles, and the simple substance sulphur solid particles and dust particles are settled to an extraction tank;

S2. washing the exhaust at a low temperature, wherein the washing liquid is a low-temperature heavy liquid phase solvent, the washed exhaust is discharged, the washed liquid flows into the extraction tank, the dust is dissolved in the light liquid phase in the extraction tank, the light liquid is discharged, and the simple substance sulphur particles are dissolved in the heavy liquid phase in the extraction tank;

S3. extracting the heavy liquid, heating it to 50-90° C. by irradiation, collecting simple substance sulphur particles, and evaporating to produce a heavy gas phase solvent;

S4. cooling the heavy gas phase solvent to a temperature below 25° C. so that the heavy gas phase solvent is converted into a heavy liquid phase solvent, the heavy liquid phase solvent is extracted and returned to step S2, and the washing liquid consumed for washing exhaust is replenished.

Preferably, the light liquid phase solvent in the extraction tank is water.

Preferably, the heavy liquid phase solvent in the extraction tank is carbon disulfide.

Preferably, cooling at an extremely high speed is performed using liquid nitrogen and/or liquid helium.

A system for realizing the gas-solid separating method for simple substance sulphur in sulphur-containing exhaust as shown in FIG. 1 comprises a quick cooling system, a low-temperature washing and purifying system, a light liquid phase and heavy liquid phase separating system, a washing liquid recycling system and a simple substance sulphur recycling system, the exhaust discharging end of the quick cooling system is connected with the exhaust inlet end of the low-temperature washing and purifying system through a pipeline, the light liquid phase and heavy liquid phase separating system is connected with the discharging port of the simple substance sulphur and dust of the cooling system and the discharging port of the washing liquid of the low-temperature washing and purifying system, respectively, the washing liquid of the low-temperature washing and purifying system is a low-temperature heavy liquid phase solvent, the discharging end of the heavy liquid phase of the light liquid phase and heavy liquid phase separating system is connected with the washing liquid recycling system through a pipeline, the discharging end of the washing liquid of the washing liquid recycling system is connected with the low-temperature washing and purifying system, and the discharging end of the simple substance sulphur of the washing liquid recycling system is connected with the simple substance sulphur recycling system.

Preferably, a delivery pump 15 is provided between the discharging end of the washing liquid of the washing liquid recycling system and the low-temperature washing and purifying system.

Preferably, the quick cooling system comprises a dry quenching tower 1 and a coolant storage tank 3 provided outside the dry quenching tower 1, the dry quenching tower 1 is provided with an antifreezing spraying pipe 2, the antifreezing spraying pipe 2 is connected with the coolant storage tank 3, and an exhaust outlet is provided at the top of the dry quenching tower 1.

Preferably, the low-temperature washing and purifying system comprises a washing tower 4 and a low-temperature heavy liquid phase solvent spraying pipe 5 provided in the washing tower 4, and the lower part of the side of the washing tower 4 is provided with an exhaust inlet.

Preferably, the light liquid phase and heavy liquid phase separating system comprises an extraction tank 6, a light liquid phase pump 7, and a heavy liquid phase pump 8, the upper part of the extraction tank 6 is connected with the discharging port of the simple substance sulphur and dust at the bottom of the dry quenching tower 1, and the discharging port of the washing liquid at the bottom of the washing tower 4, the upper part of the side of the extraction tank 6 is provided with a light liquid discharging pipe and the bottom thereof is provided with a heavy liquid discharging pipe, the light liquid phase pump 7 is connected with the light liquid discharging pipe, and the heavy liquid discharging pipe is connected with the heavy liquid phase pump 8.

Preferably, the extraction tank 6 is provided with a light liquid phase solvent replenishing pipe.

Preferably, the washing liquid recycling system comprises an irradiation tower 9 and a cooling tower 10, the irradiation tower 9 is provided with an irradiator 11, the irradiation tower 9 is connected with the discharging end of the heavy liquid phase of the heavy liquid phase separating system through a pipeline, the top of the irradiation tower 9 is connected with the top of the cooling tower 10 through a pipeline, the cooling tower 10 is connected with the low-temperature washing and purifying system through a pipeline, the simple substance sulphur recycling system is a sulphur receiving tank 12, and the sulphur receiving tank 12 is provided in the sulphur discharging port at the bottom of the irradiation tower 9.

Preferably, a heat exchanger is provided in the cooling tower 10, the heat exchanger is connected with the cooling water storage tank 13 outside the cooling tower 10 through a pipeline, and the pipeline is provided with a recycling pump 14.

Preferably, the cooling liquid in the coolant storage tank 3 is liquid nitrogen and/or liquid helium.

Preferably, there are a plurality of low-temperature heavy liquid phase solvent spraying pipes 5, all of which are horizontal. Both ends of the low-temperature heavy liquid phase solvent spraying pipe 5 are provided with spraying ports, and two upper and lower adjacent low-temperature heavy liquid phase solvent spraying pipes 5 are provided in a misaligned manner.

Preferably, there are a plurality of irradiators 11 arranged in a ring shape along the inner wall of the irradiation tower 9 in sequence, and the irradiating ends of the irradiator 11 are inclined downward and the inclination angle is 30-60°.

The working principle and working process of the system of the present invention are as follows: the sulphur-containing exhaust enters the dry quenching tower 1 and the coolant sprayed by the antifreezing spraying pipe 2 cools the exhaust to a temperature of below 25° C. at an extremely high speed, so that the simple substance sulphur vapor in the exhaust is condensed into single substance sulphur solid particles, and simple substance sulphur solid particles and dust particles settle into the extraction tank 6; the exhaust enters the washing tower 4 through the top of the dry quenching tower 1 to ascend. During the ascending process, the low-temperature heavy liquid phase solvent ejected from the low-temperature heavy liquid phase solvent spraying pipe 5 washes the exhaust. The washed exhaust is discharged from the top of the washing tower 4 and the washing liquid falls into the extraction tank 6. The dust is dissolved in the light liquid phase of the extraction tank 6 and is discharged through the light liquid phase pump 7. The simple substance sulphur particles are dissolved in the heavy liquid phase in the extraction tank 6 and transported to the sulphur receiving tank 12 at the bottom of the irradiation tower 9 through the heavy liquid phase pump 8. The temperature rises to 50 to 90° C. when being heated by the irradiator 11. The simple substance sulphur particles are recycled from the bottom of the sulphur receiving tank 12. The heavy gas phase solvent generated by evaporation enters the cooling tower 10, and cools to the temperature below 25° C. under the action of the heat exchanger so that the gas phase solvent is converted into heavy liquid phase solvent and settled to the bottom of cooling tower 10. The heavy liquid phase solvent is sent back to the washing tower 4 under the action of the delivery pump 15 to be sprayed by the low-temperature heavy liquid phase solvent spraying pipe 5 again.

The present invention will be further described with reference to the embodiments 1 to 3.

Embodiment 1

The gas-solid separating method for simple substance sulphur in sulphur-containing exhaust comprises the following steps:

S1. rapidly cooling the sulphur-containing exhaust to a temperature below 25° C. so that the simple substance sulphur vapor in the sulphur-containing exhaust is condensed into simple substance sulphur solid particles, and the simple substance sulphur solid particles and dust particles are settled to an extraction tank;

S2. washing the exhaust at a low temperature, wherein the washing liquid is a low-temperature heavy liquid phase solvent, the washed exhaust is discharged, the washed liquid flows into the extraction tank, the dust is dissolved in the light liquid phase in the extraction tank, the light liquid is discharged, and the simple substance sulphur particles are dissolved in the heavy liquid phase in the extraction tank;

S3. extracting the heavy liquid, heating it to 90° C. by irradiation, collecting simple substance sulphur particles, and evaporating to produce a heavy gas phase solvent;

S4. cooling the heavy gas phase solvent to a temperature below 25° C. so that the heavy gas phase solvent is converted into a heavy liquid phase solvent, the heavy liquid phase solvent is extracted and returned to step S2, and the washing liquid consumed for washing exhaust is replenished. The simple substance sulphur separating efficiency reaches 98%.

Embodiment 2

The gas-solid separating method for simple substance sulphur in sulphur-containing exhaust comprises the following steps:

S1. rapidly cooling the sulphur-containing exhaust to a temperature below 20° C. so that the simple substance sulphur vapor in the sulphur-containing exhaust is condensed into simple substance sulphur solid particles, and the simple substance sulphur solid particles and dust particles are settled to an extraction tank;

S2. washing the exhaust at a low temperature, wherein the washing liquid is a low-temperature heavy liquid phase solvent, the washed exhaust is discharged, the washed liquid flows into the extraction tank, the dust is dissolved in the light liquid phase in the extraction tank, the light liquid is discharged, and the simple substance sulphur particles are dissolved in the heavy liquid phase in the extraction tank;

S3. extracting the heavy liquid, heating it to 70° C. by irradiation, collecting simple substance sulphur particles, and evaporating to produce a heavy gas phase solvent;

S4. cooling the heavy gas phase solvent to a temperature below 20° C. so that the heavy gas phase solvent is converted into a heavy liquid phase solvent, the heavy liquid phase solvent is extracted and returned to step S2, and the washing liquid consumed for washing exhaust is replenished. The simple substance sulphur separating efficiency reaches 95%.

Embodiment 3

The gas-solid separating method for simple substance sulphur in sulphur-containing exhaust comprises the following steps:

S1. rapidly cooling the sulphur-containing exhaust to a temperature below 10° C. so that the simple substance sulphur vapor in the sulphur-containing exhaust is condensed into simple substance sulphur solid particles, and the simple substance sulphur solid particles and dust particles are settled to an extraction tank;

S2. washing the exhaust at a low temperature, wherein the washing liquid is a low-temperature heavy liquid phase solvent, the washed exhaust is discharged, the washed liquid flows into the extraction tank, the dust is dissolved in the light liquid phase in the extraction tank, the light liquid is discharged, and the simple substance sulphur particles are dissolved in the heavy liquid phase in the extraction tank;

S3. extracting the heavy liquid, heating it to 50° C. by irradiation, collecting simple substance sulphur particles, and evaporating to produce a heavy gas phase solvent;

S4. cooling the heavy gas phase solvent to a temperature below 10° C. so that the heavy gas phase solvent is converted into a heavy liquid phase solvent, the heavy liquid phase solvent is extracted and returned to step S2, and the washing liquid consumed for washing exhaust is replenished. The simple substance sulphur separating efficiency reaches 96%.

What is claimed is:

1. A gas-solid separating method for simple substance sulphur in sulphur-containing exhaust, comprising the following steps:

a) cooling the sulphur-containing exhaust comprising simple substance sulphur vapor and dust particles to a temperature below 25° C. so that the simple substance sulphur vapor in the sulphur-containing exhaust is condensed into simple substance sulphur solid particles, and the simple substance sulphur solid particles and the dust particles are settled to an extraction tank to produce a first exhaust;
b) washing the first exhaust with first washing liquid to produce second exhaust and second washing liquid, wherein the first washing liquid is a first heavy liquid phase solvent, the second exhaust is discharged, the second washing liquid flows into the extraction tank and is layered into a light liquid phase solvent and a second heavy liquid phase solvent, the dust particles are dissolved in the light liquid phase solvent in the extraction tank, the light liquid phase solvent is discharged, and the simple substance sulphur particles are dissolved in the second heavy liquid phase solvent in the extraction tank;
c) extracting the second heavy liquid phase solvent, heating the extraction tank to 50-90° C. by irradiation, collecting the simple substance sulphur particles, and evaporating to produce a heavy gas phase solvent;
d) cooling the heavy gas phase solvent to a temperature below 25° C. so that the heavy gas phase solvent is converted into the first heavy liquid phase solvent, the first heavy liquid phase solvent is extracted and returned to step 1, and the first washing liquid consumed for washing the first exhaust is replenished.

2. The gas-solid separating method for simple substance sulphur in sulphur-containing exhaust according to claim 1, wherein the light liquid phase solvent in the extraction tank is water.

3. The gas-solid separating method for simple substance sulphur in sulphur-containing exhaust according to claim 1, wherein the second heavy liquid phase solvent in the extraction tank is carbon disulfide.

4. The gas-solid separating method for simple substance sulphur in sulphur-containing exhaust according to claim 1, wherein the cooling is performed using liquid nitrogen or liquid helium.

5. A system for realizing the gas-solid separating method for simple substance sulphur in sulphur-containing exhaust according to claim 1, comprising a quick cooling system, a low-temperature washing and purifying system, a light liquid phase and heavy liquid phase separating system, a washing liquid recycling system and a simple substance sulphur recycling system, the exhaust discharging end of the quick cooling system is connected with the exhaust inlet end of the low-temperature washing and purifying system through a pipeline, the light liquid phase and heavy liquid phase separating system is connected with the discharging port of the simple substance sulphur and dust of the cooling system and the discharging port of the washing liquid of the low-temperature washing and purifying system, respectively, the washing liquid of the low-temperature washing and purifying system is a low-temperature heavy liquid phase solvent, the discharging end of the heavy liquid phase of the light liquid phase and heavy liquid phase separating system is connected with the washing liquid recycling system through a pipeline, the discharging end of the washing liquid of the washing liquid recycling system is connected with the low-temperature washing and purifying system, and the discharging end of the simple substance sulphur of the washing liquid recycling system is connected with the simple substance sulphur recycling system.

6. The system for the gas-solid separating method for simple substance sulphur in sulphur-containing exhaust according to claim 5, wherein the quick cooling system comprises a dry quenching tower and a coolant storage tank provided outside the dry quenching tower, the dry quenching tower is provided with an antifreezing spraying pipe, the antifreezing spraying pipe is connected with the coolant storage tank, and an exhaust outlet is provided at the top of the dry quenching tower.

7. The system for the gas-solid separating method for simple substance sulphur in sulphur-containing exhaust according to claim 5, wherein the low-temperature washing and purifying system comprises a washing tower and a low-temperature heavy liquid phase solvent spraying pipe provided in the washing tower, and the lower part of the side of the washing tower is provided with an exhaust inlet.

8. The system for the gas-solid separating method for simple substance sulphur in sulphur-containing exhaust according to claim 5, wherein the light liquid phase and heavy liquid phase separating system comprises an extraction tank, a light liquid phase pump, and a heavy liquid phase pump, the upper part of the extraction tank is connected with the discharging port of the simple substance sulphur and dust at the bottom of the dry quenching tower, and the discharging port of the washing liquid at the bottom of the washing tower, the upper part of the side of the extraction tank is provided with a light liquid discharging pipe and the bottom thereof is provided with a heavy liquid discharging pipe, the light liquid phase pump is connected with the light liquid discharging pipe, and the heavy liquid discharging pipe is connected with the heavy liquid phase pump.

9. The system for the gas-solid separating method for simple substance sulphur in sulphur-containing exhaust according to claim 8, wherein the extraction tank is provided with a light liquid phase solvent replenishing pipe.

10. The system for the gas-solid separating method for simple substance sulphur in sulphur-containing exhaust according to claim 5, wherein the washing liquid recycling system comprises an irradiation tower and a cooling tower, the irradiation tower is provided with an irradiator, the irradiation tower is connected with the discharging end of the heavy liquid phase of the heavy liquid phase separating system through a pipeline, the top of the irradiation tower is connected with the top of the cooling tower through a pipeline, the cooling tower is connected with the low-temperature washing and purifying system through a pipeline, the simple substance sulphur recycling system is a sulphur receiving tank, and the sulphur receiving tank is provided in the sulphur discharging port at the bottom of the irradiation tower.

11. A system for realizing the gas-solid separating method for simple substance sulphur in sulphur-containing exhaust according to claim 2, comprising a quick cooling system, a low-temperature washing and purifying system, a light liquid phase and heavy liquid phase separating system, a washing liquid recycling system and a simple substance sulphur recycling system, the exhaust discharging end of the quick cooling system is connected with the exhaust inlet end of the low-temperature washing and purifying system through a pipeline, the light liquid phase and heavy liquid phase separating system is connected with the discharging port of the simple substance sulphur and dust of the cooling system and the discharging port of the washing liquid of the low-temperature washing and purifying system, respectively, the washing liquid of the low-temperature washing and purifying system is a low-temperature heavy liquid phase solvent, the discharging end of the heavy liquid phase of the light liquid phase and heavy liquid phase separating system is connected with the washing liquid recycling system through a pipeline, the discharging end of the washing liquid of the washing liquid recycling system is connected with the low-temperature washing and purifying system, and the discharging end of the simple substance sulphur of the washing liquid recycling system is connected with the simple substance sulphur recycling system.

12. A system for realizing the gas-solid separating method for simple substance sulphur in sulphur-containing exhaust according to claim 3, comprising a quick cooling system, a low-temperature washing and purifying system, a light liquid phase and heavy liquid phase separating system, a washing liquid recycling system and a simple substance sulphur recycling system, the exhaust discharging end of the quick cooling system is connected with the exhaust inlet end of the low-temperature washing and purifying system through a pipeline, the light liquid phase and heavy liquid phase separating system is connected with the discharging port of the simple substance sulphur and dust of the cooling system and the discharging port of the washing liquid of the low-temperature washing and purifying system, respectively, the washing liquid of the low-temperature washing and purifying system is a low-temperature heavy liquid phase solvent, the discharging end of the heavy liquid phase of the light liquid phase and heavy liquid phase separating system is connected with the washing liquid recycling system through a pipeline, the discharging end of the washing liquid of the washing liquid recycling system is connected with the low-temperature washing and purifying system, and the discharging end of the simple substance sulphur of the washing liquid recycling system is connected with the simple substance sulphur recycling system.

13. A system for realizing the gas-solid separating method for simple substance sulphur in sulphur-containing exhaust according to claim 4, comprising a quick cooling system, a low-temperature washing and purifying system, a light liquid phase and heavy liquid phase separating system, a washing liquid recycling system and a simple substance sulphur recycling system, the exhaust discharging end of the quick cooling system is connected with the exhaust inlet end of the low-temperature washing and purifying system through a pipeline, the light liquid phase and heavy liquid phase separating system is connected with the discharging port of the simple substance sulphur and dust of the cooling system and the discharging port of the washing liquid of the low-temperature washing and purifying system, respectively, the washing liquid of the low-temperature washing and purifying system is a low-temperature heavy liquid phase solvent, the discharging end of the heavy liquid phase of the light liquid phase and heavy liquid phase separating system is connected with the washing liquid recycling system through a pipeline, the discharging end of the washing liquid of the washing liquid recycling system is connected with the low-temperature washing and purifying system, and the discharging end of the simple substance sulphur of the washing liquid recycling system is connected with the simple substance sulphur recycling system.

14. The system for the gas-solid separating method for simple substance sulphur in sulphur-containing exhaust according to claim 6, wherein the quick cooling system comprises a dry quenching tower and a coolant storage tank provided outside the dry quenching tower, the dry quenching tower is provided with an antifreezing spraying pipe, the antifreezing spraying pipe is connected with the coolant storage tank, and an exhaust outlet is provided at the top of the dry quenching tower.

15. The system for the gas-solid separating method for simple substance sulphur in sulphur-containing exhaust according to claim 7, wherein the quick cooling system comprises a dry quenching tower and a coolant storage tank provided outside the dry quenching tower, the dry quenching tower is provided with an antifreezing spraying pipe, the antifreezing spraying pipe is connected with the coolant storage tank, and an exhaust outlet is provided at the top of the dry quenching tower.

16. The system for the gas-solid separating method for simple substance sulphur in sulphur-containing exhaust according to claim 8, wherein the quick cooling system comprises a dry quenching tower and a coolant storage tank provided outside the dry quenching tower, the dry quenching tower is provided with an antifreezing spraying pipe, the antifreezing spraying pipe is connected with the coolant storage tank, and an exhaust outlet is provided at the top of the dry quenching tower.

17. The system for the gas-solid separating method for simple substance sulphur in sulphur-containing exhaust according to claim 6, wherein the low-temperature washing and purifying system comprises a washing tower and a low-temperature heavy liquid phase solvent spraying pipe provided in the washing tower, and the lower part of the side of the washing tower is provided with an exhaust inlet.

18. The system for the gas-solid separating method for simple substance sulphur in sulphur-containing exhaust according to claim 7, wherein the low-temperature washing and purifying system comprises a washing tower and a low-temperature heavy liquid phase solvent spraying pipe provided in the washing tower, and the lower part of the side of the washing tower is provided with an exhaust inlet.

19. The system for the gas-solid separating method for simple substance sulphur in sulphur-containing exhaust according to claim 8, wherein the low-temperature washing and purifying system comprises a washing tower and a low-temperature heavy liquid phase solvent spraying pipe provided in the washing tower, and the lower part of the side of the washing tower is provided with an exhaust inlet.

20. The system for the gas-solid separating method for simple substance sulphur in sulphur-containing exhaust according to claim 6, wherein the light liquid phase and heavy liquid phase separating system comprises an extraction tank, a light liquid phase pump, and a heavy liquid phase pump, the upper part of the extraction tank is connected with the discharging port of the simple substance sulphur and dust at the bottom of the dry quenching tower, and the discharging port of the washing liquid at the bottom of the washing tower, the upper part of the side of the extraction tank is provided with a light liquid discharging pipe and the bottom thereof is provided with a heavy liquid discharging pipe, the light liquid phase pump is connected with the light liquid discharging pipe, and the heavy liquid discharging pipe is connected with the heavy liquid phase pump.

* * * * *